(12) United States Patent
Pike

(10) Patent No.: US 6,213,134 B1
(45) Date of Patent: Apr. 10, 2001

(54) INTERIOR TANK CAR CLEANING APPARATUS

(75) Inventor: Richard Pike, Charleston, MO (US)

(73) Assignee: Econo Clean, Incorporated, Cairo, IL (US)

( * ) Notice: Subject to any disclaimer, the term of this patent is extended or adjusted under 35 U.S.C. 154(b) by 0 days.

(21) Appl. No.: 09/259,021

(22) Filed: Feb. 26, 1999

(51) Int. Cl.$^7$ .................................................. B08B 3/02
(52) U.S. Cl. .............................. 134/166 R; 134/167 R; 134/169 R
(58) Field of Search ...................... 134/166 R, 167 R, 134/168 C, 167 C, 169 C, 166 C, 169 R, 168 A; 15/104.31

(56) References Cited

U.S. PATENT DOCUMENTS

| | | | |
|---|---|---|---|
| Re. 27,612 | * 4/1973 | Ruppel et al. ................. | 134/168 R |
| 1,545,896 | * 7/1925 | Hanlon ........................... | 134/167 R |
| 1,624,865 | 4/1927 | Freel . | |
| 1,666,015 | * 4/1928 | Land .............................. | 134/169 R |
| 2,045,752 | * 6/1936 | Butterworth ................... | 134/168 R |
| 2,116,935 | 5/1938 | Richard et al. . | |
| 2,980,934 | * 4/1961 | Steindorf ....................... | 134/167 R |
| 3,150,669 | * 9/1964 | Green, Jr. ...................... | 134/167 R |
| 3,542,593 | * 11/1970 | Pribbernow .................... | 134/167 R |
| 3,825,022 | * 7/1974 | Metz .............................. | 134/167 R |
| 3,985,572 | 10/1976 | Petermann et al. . | |
| 4,163,455 | * 8/1979 | Herbert et al. ................. | 134/167 R |
| 4,220,170 | * 9/1980 | Hebert et al. .................. | 134/167 R |
| 4,341,232 | 7/1982 | Maton . | |
| 4,574,825 | 3/1986 | Haug . | |
| 4,805,650 | 2/1989 | Yasui et al. . | |
| 5,095,929 | 3/1992 | Harvey . | |
| 5,107,879 | 4/1992 | Harvey . | |
| 5,352,298 | 10/1994 | Moulder . | |
| 5,392,798 | 2/1995 | Hirose et al. . | |
| 5,518,553 | * 5/1996 | Moulder ........................ | 134/167 R |
| 5,584,939 | 12/1996 | Dahlin et al. . | |
| 5,594,973 | * 1/1997 | Brusseleers et al. .......... | 134/167 R |
| 5,720,310 | 2/1998 | Moulder . | |

FOREIGN PATENT DOCUMENTS

| 1357521 | * 6/1974 | (GB) | ................................ | 134/167 R |
|---|---|---|---|---|
| 889129 | * 12/1981 | (SU) | ................................ | 134/167 R |

\* cited by examiner

Primary Examiner—Frankie L. Stinson
(74) Attorney, Agent, or Firm—Charles G. Lamb; Middleton & Reutlinger

(57) ABSTRACT

A cleaning apparatus for use in the interior of tank cars includes a dome plate assembly, and a base plate assembly disposed within an open manway of a tank car. A vertically extending main solution pipe assembly extends through the dome plate assembly and its lower end terminates with and is in flow communication with a base plate assembly in the tank car. A pair of base plate solution arms are provided on opposite sides of the main solution pipe assembly and are in flow communication therewith. Support chains attached along the main solution pipe assembly are provided to support the base plate solution arms in a horizontal position. These base plate solution arms are generally pivotally attached to extension solution arms which extend outwardly therefrom and each solution arm terminate with a rotatable nozzle assembly.

3 Claims, 4 Drawing Sheets

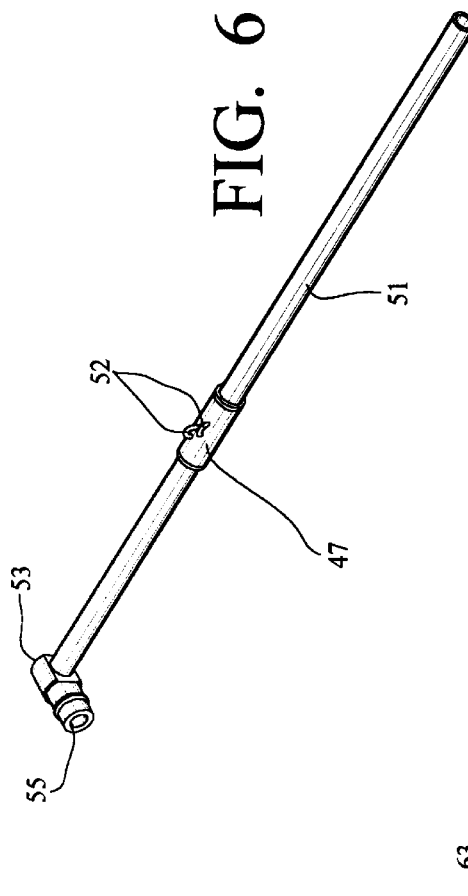
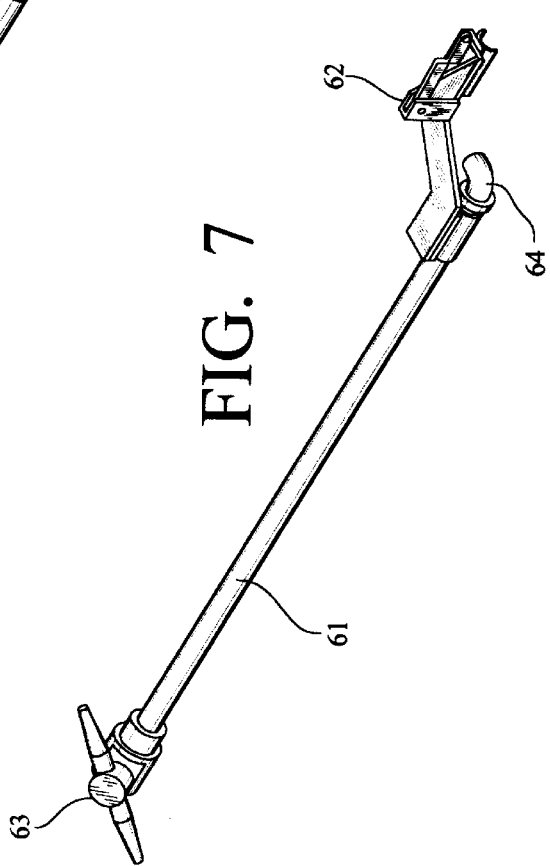
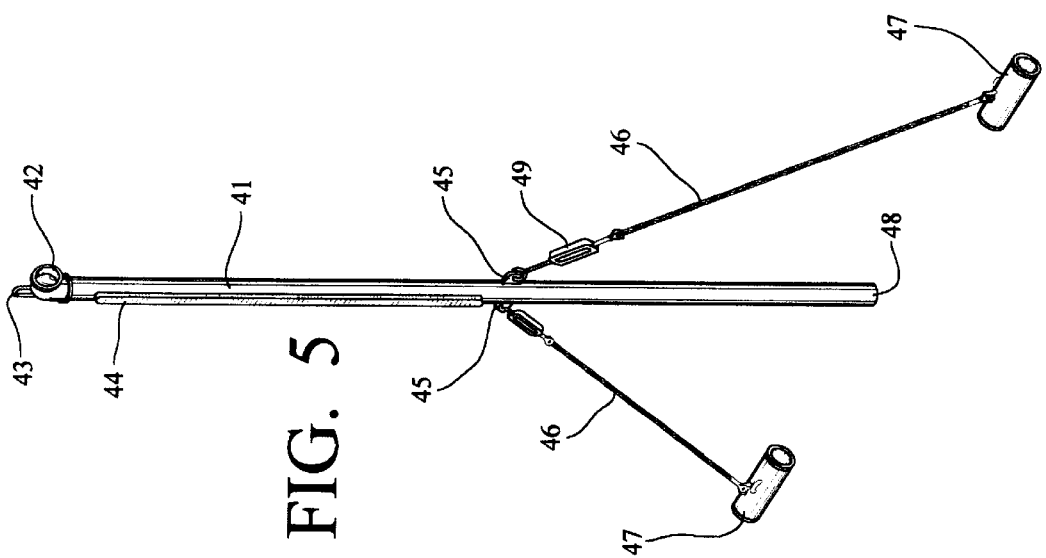

INTERIOR TANK CAR CLEANING APPARATUS

BACKGROUND OF THE INVENTION

The present invention relates to a cleaning apparatus for the interior of a tank car and more particularly, to a tank car interior cleaning device having a portable cleaning apparatus with rotary jet nozzles positionable at different locations along the length thereof.

Tank cars are generally provided with a manway centrally disposed along the top of the car and a centered bottom outlet valve wherein persons or machines may be installed into a railway car through the top opening manway. Even though there are other fixtures on a tank car, such as a safety release valve, a conductor tube for top unloading, or a rupture disc, these features do not afford any assistance in the cleaning of a tank car. By only having a centered bottom outlet valve, presently all of the cleaning solution and cleaning effluent is removed from the tank car through this opening.

Moreover, much of the cleaning of general purpose commodities transported in rail tank cars are performed using high pressure washing systems with rotary dispensing nozzles mounted in a center position within the tank car. Thus, during the cleaning operation, most of the washing solution and cleaning effluent are pushed away from the bottom outlet valve, greatly reducing the cleaning efficiency. And, equally important is the fact that many of these commodities will settle out towards the ends of the tank car which makes it very difficult to remove with conventionally centered mounted cleaning systems. Also, these interior tank cleaning systems with center mounted rotary center head nozzle systems must operate at relatively high pressure and flow.

The general purpose commodities which are transported in tank cars generally range from vegetable oils, such as soybean oil and corn oil, to petroleum base products, such as fuel oil, waxes, and the like. As many of these products are transported by rail over long distances, the settling of solids towards the ends of the car increases. Thus, when cars are unloaded, many times large quantities of product are left at the ends of these cars. Many different types of car designs have been developed to help reduce the settling problems, but to date, most tank cars have flat bottoms and therefore do not drain toward the center of the tank car which is generally provided with a centered bottom outlet valve. Because of this situation, many times it requires personnel to enter the tank car in order to clean the settled solids from the ends of the tank car. Therefore, there is a need for a cleaning device which allows for the positioning of cleaning nozzles at different locations along the length of the tank car to maximize the removal of the settled solids left in the car as well as reduce the cleaning times in properly cleaning a tank car and reduce or prevent the entrance of personnel to complete the cleaning operations.

SUMMARY OF THE INVENTION

The present invention provides a cleaning apparatus which is easily installable through a top opening central manway of a tank car.

The present invention further provides a cleaning apparatus which is capable of employing large capacity rotary jet nozzles for being removably positioned within a tank car.

The present invention even further provides a cleaning apparatus for tank cars which is capable of positioning rotary jet nozzles at different positions along the interior length of a tank car.

The present invention also provides a cleaning apparatus for the interior of a tank car wherein the positioning of rotatable nozzle assemblies is performed through mechanical manipulations of the rotatable nozzles to different positions along the length of the railway tank car.

More particularly, the present invention provides a cleaning apparatus for tank cars having a top opening manway comprising: a dome plate assembly disposed upon the open manway of a tank car; a vertically extending main solution pipe assembly extending through the dome plate assembly and at a lower end terminates at a base plate assembly; a pair of base plate solution arms on opposite sides of the main solution pipe assembly and in flow communication therewith, each of said base plate solution arms being in flow communication at a terminating end with a rotatable nozzle assembly; and, means for positioning a rotatable nozzle assembly at varying positions along the length of a tank car.

BRIEF DESCRIPTION OF THE DRAWINGS

A better understanding of the invention will be had upon reference to the following description in conjunction with the accompanying drawings in which like numerals refer to like parts throughout the several views and wherein:

FIG. 5 is a perspective view of a main solution pipe assembly of a preferred embodiment of the present invention;

FIG. 6 is a perspective view of a preferred base plate solution arms of a preferred embodiment of the present invention; and, FIG. 7 is a perspective view of an extension solution arm assembly of a preferred embodiment of the present invention.

DETAILED DESCRIPTION OF THE PREFERRED EMBODIMENT

Figure 1:
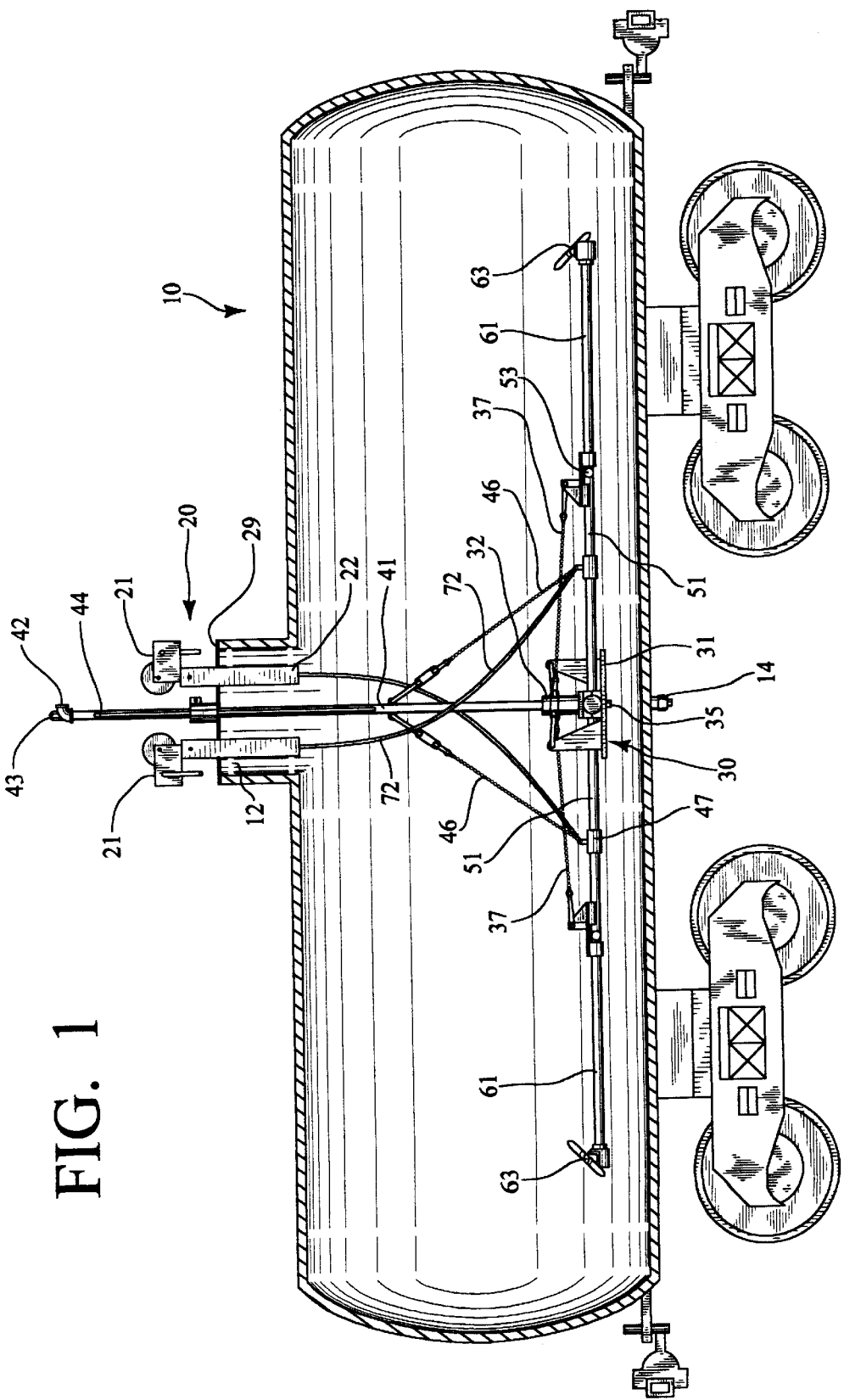
FIG. 1 is a side sectional view of a tank car showing a cleaning apparatus of the present invention in a low extended cleaning position.
Figure 2:
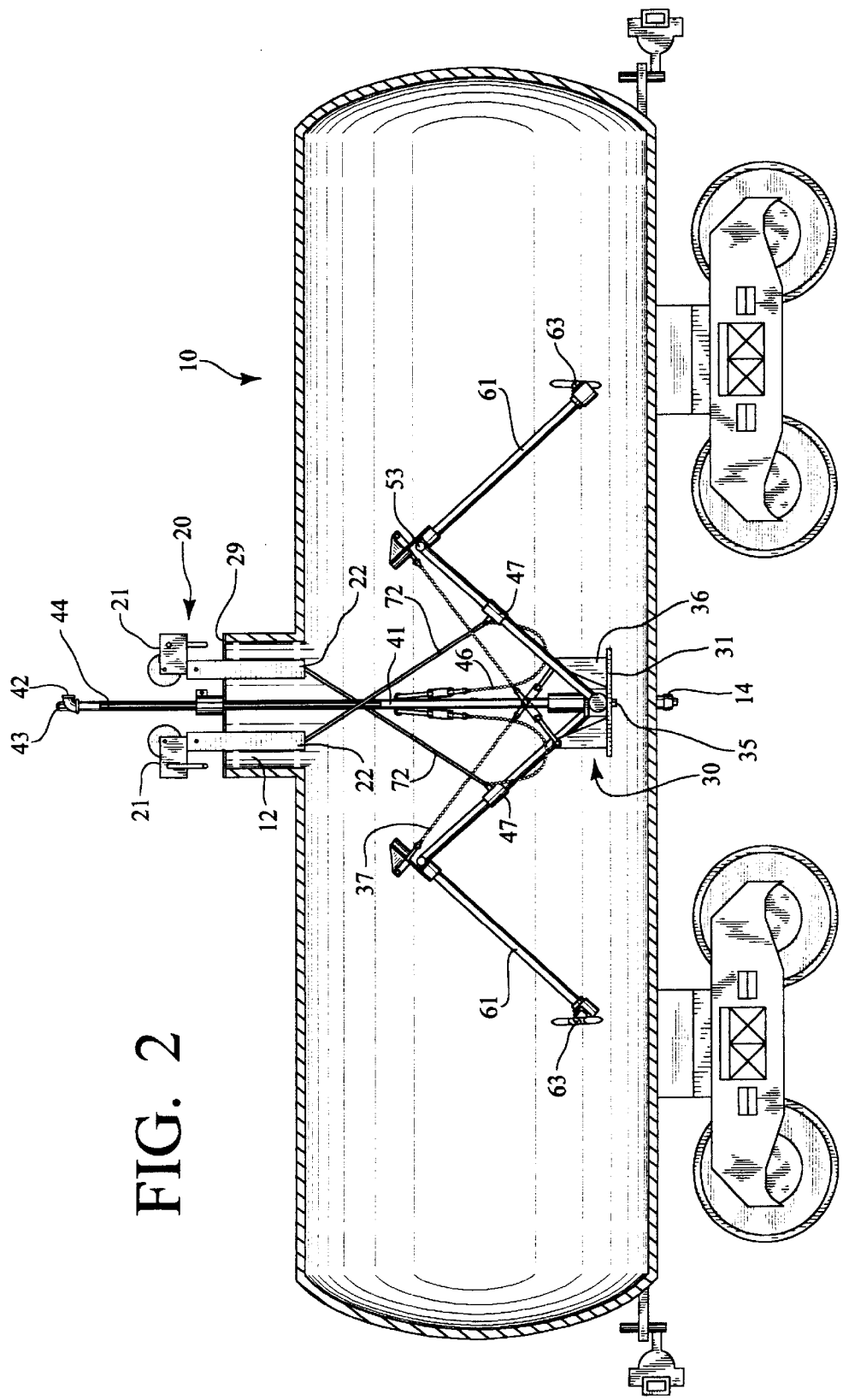
FIG. 2 is a side sectional view of the tank car of FIG. 1 showing the cleaning apparatus of the present invention in a partially retracted cleaning position.

With reference to FIGS. 1 and 2, a tank car 10 is provided with an open manway 12 centrally disposed along the top of the tank car and a centrally disposed bottom valve 14 in the bottom of the tank car 10. A dome plate assembly 20, including a dome plate 29, is mounted onto an outer flange portion of the manway 12. Dome plate assembly 20 is provided with a pair of wench and cable assemblies 21 which are operable in response to manual manipulation of handles 21a. Wench cable guide arms 22 are also provided with apertures therein to receive one end of cable 72 which are attached to pipe swivels 52 disposed along base plate solution arms 51. A main solution pipe 41 extends downwardly through the dome plate 29 and its upward most end is provided with a solution inlet 42. The lower terminating end of the main solution supply pipe 41 is received within a solution supply pipe 32 of a base plate assembly 30. The solution supply pipe 32 is in flow communication with a pair of base plate solution arms 51 which extend in opposite directions towards the ends of the tank car 10. The base plate solution arms 51 terminate in upper swivels 53 which are attachable to and in flow communication with inlets to conduits 61. Conduits 61 extend outwardly toward the opposite ends of the tank car 10 and terminate in rotary or spinning cleaning nozzles 63.

Figure 3:
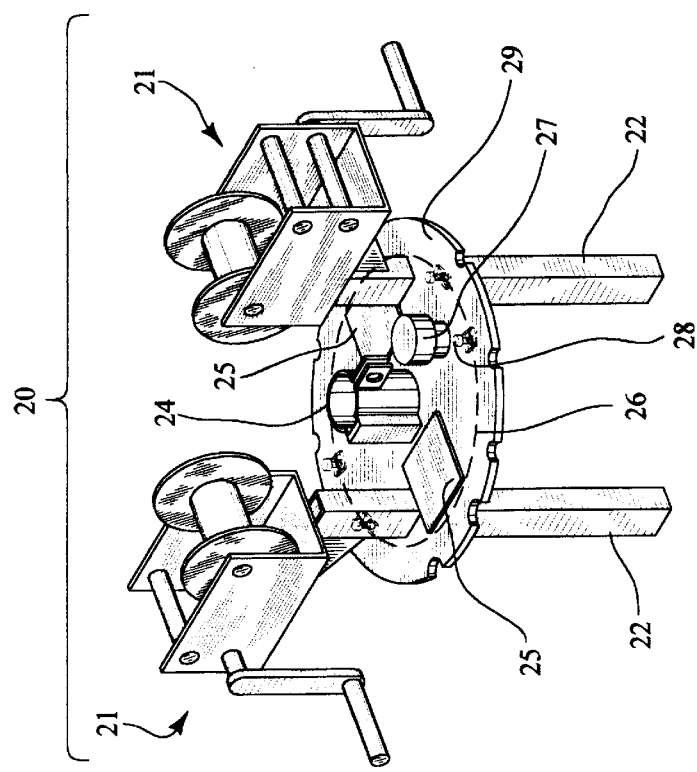
FIG. 3 is a perspective view, partially in section, of a dome plate assembly of the present invention.

As best shown in FIG. 3, the dome plate assembly 20 is the main support of the cleaning apparatus of the present invention. The dome plate assembly 20 is affixed to the open manway 12 of tank car 10 using dome bolts (not shown) of the tank car 10 that hold in place the dome plate 29 which replaces the dome lid (not shown) of the tank car 10. A collar lock 24, when loosened, is provided on the dome plate 29 to receive the main solution supply pipe 41 therethrough thereby allowing this pipe to be raised or lowered by an overhead hoisting fixture (not shown). The dome plate assembly 20 is also provided with two wench and cable assembles 21 which are used to raise and lower the base plate solution arms 51 (FIG. 6) and extension pipe solution arms 61 (FIG. 7). The plate assembly 20 is also provided with wench cable guide arms 22 which control the operating positions of the wench cable. The wench cable guide arms 22 are positioned on the dome plate 29 so as to allow for raising and lowering the solution arms 51 and 61 while missing most of the internal features that are contained in many general purpose tank cars. The collar lock 24 is provided to hold the main solution supply pipe in a preselected or desired position. A dome lid inspection port 25 is provided to allow visual entry into a tank car during operation of the cleaning apparatus. Gasket support rings 26 are located on the bottom side of the dome plate 29 to hold the gasket, if required, in place. A dome plate vent outlet 27 is provided for venting a tank car while cleaning. However, in some instances, tank cars are not provided with a bottom outlet valve in which case this vent outlet 27 can be used for removing the cleaning solution from the tank car during a cleaning operation. Dome plate lock down shims 28 are provided for easy securement of the dome plate 29 to the manway 12 of a tank car 10 using the tank car dome lid bolts. As shown, the dome plate 29 is provided with precut notches for the dome lid bolts of various designed tank cars to fit into and for securing the dome plate assembly 20 to a tank car 10.

Figure 4:
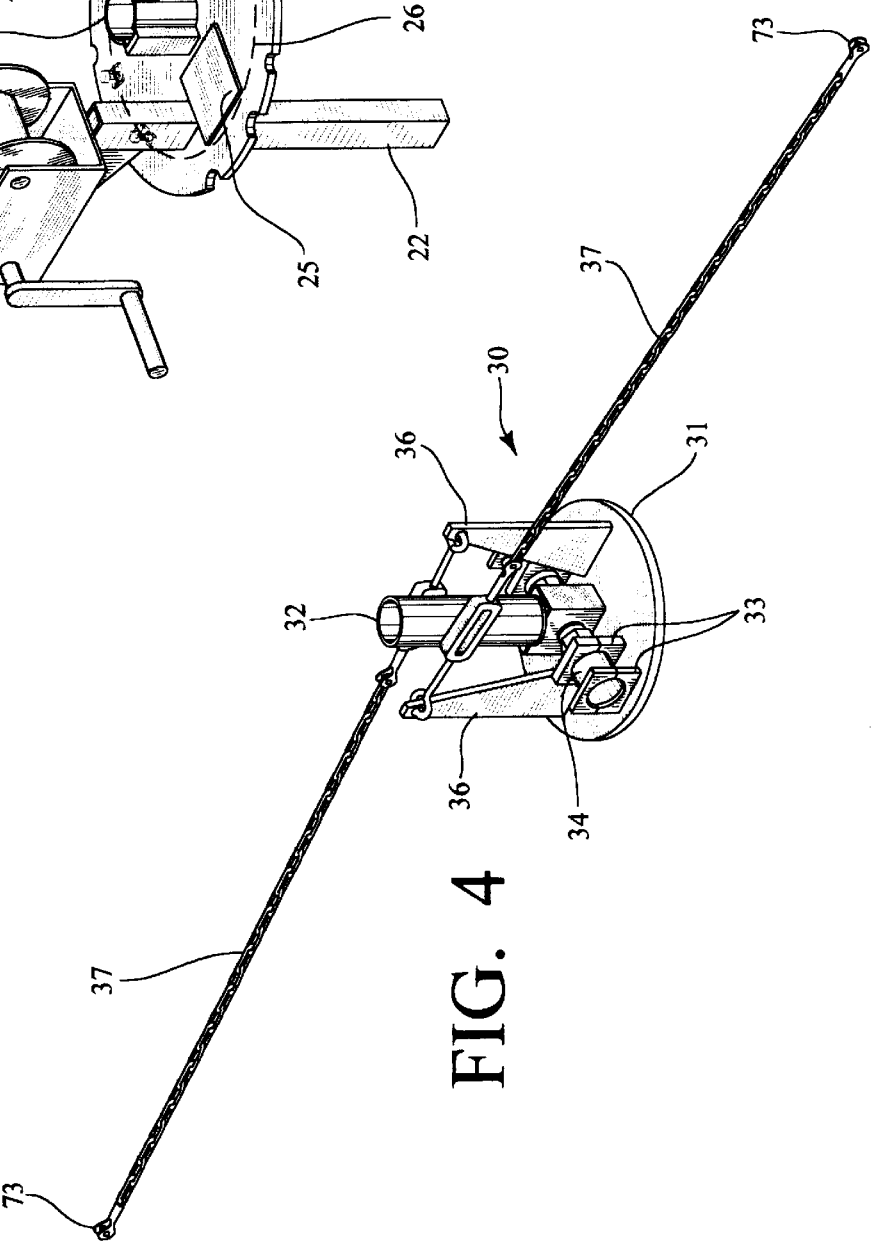
FIG. 4 is a perspective view of a base plate assembly of a preferred embodiment of the present invention.

As best shown in FIG. 4, a base plate assembly 30 is provided as the primary support unit for the main solution pipe 41 (FIG. 5), the base plate solution arms 51 (FIG. 6), and the extension solution arms 61 and spinner heads or rotary nozzles 53 (FIG. 7) as well as the controlling mechanisms employed for extending and retracting the arms 51 and 61 during operation. The base plate 31 is of a preselected diameter to fit within most, if not all, of the manway openings 12 of tank cars 10. Base plate assembly 30 is also provided with a solution supply pipe and a swivel housing 32 which provides the housing for the main solution supply pipe 41 as well as the openings in fluid communication with connecting super swivels 34. Super swivel support pillow blocks 33 are included to provide for permanent location of the super swivel 34 as the super swivels must be maintained in a stationary position. The super swivels 34 attach to the main solution supply pipe 41 and swivel housing 32 providing the pivotal means for lowering and raising the base plate solution arms 51. A solution pipe drain plug 35 may also be located on the bottom side of the base plate 30 to allow for complete drainage of the main solution supply pipe 41. Support brackets 36 are also provided as the means to receive one end of the positioning chains 37 wherein the opposed ends 73 of the positioning chains 37 are attached to extension arm positioning bracket 62 (FIG. 7) which allows for the lowering and raising of the base plate solution arms 51 and extension pipe solution arms 61 thereby maintaining the rotary nozzles 63 on the same plane as the base plate 31.

As best shown in FIG. 5, the main solution pipe 41 supplies the cleaning solution for the operation of the cleaning apparatus of the present invention. The main solution supply pipe 41 is provided with an inlet 42 which is flow communication with a cleaning solution supply source (not shown) and an outlet 48, which as discussed previously is received by solution supply pipe and swivel housing 32. A lifting bracket 43, which is generally of U-shaped configuration, is attached to the inlet 42 as the means for attaching the cleaning apparatus to an existing mechanism (not shown) for removing the cleaning apparatus from a tank car 10. The solution inlet 42 is generally a 90 degree elbow containing a quick coupling for a cleaning solution supply hose connection (not shown). A dome assembly guide bar 44 is provided as a permanent guide affixed to the main solution supply pipe 41 and passes through the collar lock 24 of the dome plate assembly 20 thereby permanently aligning and affixing the main solution supply pipe 41 therein. Anchors 45 are provided on opposite sides of the main solution supply pipe 41 for receiving the leveling support chains 46 and thereby permanently affixing the leveling support chains 46 to the main solution supply pipe 41. The leveling support chains 46 are provided with turn buckles 49 which provide the proper adjustment for the base plate solution arms 51 and extension pipe solution arms 61 when the arms are fully extended in a cleaning operation. Extension arm stop brackets 47 are attached at the terminating ends of the leveling support chains 46 for attaching the leveling support chains 46 to the base plate solution arms 51.

As best shown in FIG. 6, the base plate solution arms 51 are connected to the base plate 31 by super swivels 53 thereby providing the necessary width for clearance of interior fixtures, and for the extension and retraction of the base plate solution arms 51 and extension pipe solution arms 61. A pipe swivel and cable anchor 52 is provided as the means to attach the leveling support chains 46 from the main solution supply pipe 41. Outermost ends of the base plate solution arms 51 are moveably attached to the extension pipe solution arms 61 and rotating nozzles 53.

As best shown in FIG. 7, the extension pipe solution arms 51 are moveably connected to the base plate solution arms 51 (FIG. 6) to provide the flow of cleaning solutions to the rotary nozzles or spinning heads 63, such as, for example, a Butterworth Lt Machine. An extension arm positioning bracket 62 and inlet elbow 64 secures the attachment of the extension pipe solution arms 61 to the base plate solution arms 51 at the super swivels 53 which is provided also with a rotatable connecting outlet 55 (FIG. 6) for connecting with the inlet 64 (FIG. 7). The positioning chains 37 (FIG. 4) are provided with terminating ends 73 (FIG. 4) which attaches to an extension arms positioning bracket assembly 62 to support the positioning bracket assembly 62 at a preselected position.

In operation, the cleaning apparatus of the present invention is lowered into tank car 10 by a wench or cable system through the manway opening 12. The cleaning apparatus is lowered toward the bottom of the tank car 10 until the solution arms 51 and 61 clear the manway opening 12 and the base plate assembly 30 is at a preselected position from the bottom of car 10. The wenches and cable assembly 21 lower the solution arms 51 and 61 until the arms 51 and 61 are fully extended. The dome plate 29 is then affixed to the tank car manway 12 using existing dome bolts of the tank car 10 thus positioning and securing the cleaning apparatus for operation. The cleaning apparatus is then raised, as necessary, by the supporting cable 72 to a desired operating height in the tank car 10. This height may vary from commodity to commodity, but generally when the unit is in an operating position with the solution arms 51 and 52 fully extended, the rotating nozzles or spinner heads 63 need to be about 3 to 4 feet from the bottom of the tank car 10. This distance seems to provide the optimum velocity or force for cleaning in proximity to the product or commodity and at the same time, maximizing the effluent from the tank car 10. When the cleaning apparatus is at the desired operating position, the collar lock 24 is secured to the main solution supply pipe 41 so the main solution supply pipe 41 is not movable during the cleaning operation. A cleaning solution supply hose is then connected to the inlet 42 of the main solution supply pipe, the cleaning supply hose being in flow communication with a pumping system (not shown). A solution is run through the conduits of the cleaning apparatus, usually at about 150 psi pressure and 150 gallons per minute until the tank car 10 has been determined to be sufficiently cleaned with the rotary nozzles 63 being repositioned, as required, along the interior length of the car 10. When the cleaning cycle is complete, the pumping system is turned off and the tank car 10 is allowed to fully drain, generally out through the outlet valve 14. The hose supplying the cleaning solution to the main solution supply pipe 41 can be unhooked or left in place as determined by operating conditions. The collar lock 24 on the dome plate assembly 20 is loosened to allow the unit to be lowered to the bottom of the tank car 10. Wench and cable assemblies 21 are then used to raise the solution arms 51 and 61 to a preselected retracted position and the collar lock 24 is secured. The dome plate 29 of the cleaning unit is then unfastened from the dome bolts of the tank car 10, thus allowing for the cleaning apparatus to be removed from the tank car 10.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A cleaning apparatus for a tank car having an open manway in a top thereof comprising:

a dome plate assembly, a base plate assembly, and a vertically extending main solution pipe extending through said open manway of said tank car, said dome plate assembly being attached over said manway, said vertically extending main solution pipe extending through said dome plate assembly and being attached at a lower extremity to said base plate assembly;

a pair of base plate solution arms disposed on opposite sides of the main solution pipe at its lower extremity and in flow communication at a first end of each base plate solution arm with said main solution pipe, each said base plate solution arm having an opposed end movably connected to an extension solution arm; and, means to movably support and raise and lower said base plate solution arms in relation to said main solution pipe.

2. The apparatus of claim 1 wherein said means to support said base plate solution includes a pair of support chains mounted to said base plate assembly, each of the support chains having an outwardly terminating end attached to one of said base plate solution arms.

3. The apparatus of claim 1, said extension solution arm having an outlet terminating with a rotatable nozzle assembly.

* * * * *